United States Patent [19]

Hackett-Jones et al.

[11] Patent Number: 4,555,599

[45] Date of Patent: Nov. 26, 1985

[54] SIGNAL TRANSMISSION DEVICES

[75] Inventors: Francis C. Hackett-Jones, Kent, England; Frederick H. Kiko, Aurora, Colo.

[73] Assignee: Telspec Limited, Rochester, England

[21] Appl. No.: 588,006

[22] Filed: Mar. 9, 1984

[30] Foreign Application Priority Data

Mar. 18, 1983 [GB] United Kingdom ............... 8307628

[51] Int. Cl.$^4$ ............................................. H04B 3/36
[52] U.S. Cl. ........................... 179/170 R; 179/170 D; 339/119 R
[58] Field of Search ............. 179/170 R, 170 D, 16 F; 339/119

[56] References Cited

U.S. PATENT DOCUMENTS 3,818,151 6/1974 Chambers, Jr. et al. ... 179/170 R X
3,989,906 11/1976 Kiko ................................. 179/170 R
3,989,907 11/1976 Chambers ....................... 179/170 R Primary Examiner—James L. Dwyer
Attorney, Agent, or Firm—Berman, Aisenberg & Platt

[57] ABSTRACT

A signal transmission device capable, for example, of use as a hybrid circuit in a voice frequency telephone transmission system, comprises a controllable substantially load independent current source shunting a signal path between input and output ports of the device. The shunt path is de-coupled from a signal source or load to be connected to respective ports of the transmission device by series connected impedances which are high in relation to those of the respective source or load, while the current source is arranged to respond to a voltage signal applied to the input port in order to drive corresponding currents through the impedances. A current steering circuit is provided to determine the relative magnitudes of the currents driven through the respective impedances, and thus to determine the virtual impedances presented to the signal source and load as well as the signal gain of the device.

7 Claims, 4 Drawing Figures

SIGNAL TRANSMISSION DEVICES

BACKGROUND OF THE INVENTION

This invention concerns improvements in and relating to signal transmission devices, more especially, but not exclusively, voice frequency transmission devices such as line repeaters, impedance matching devices, or hybrid amplifiers for incorporation in telephone communication systems.

In order to achieve amplification of the bidirectional signals occurring in a telephone line, a so-called hybrid circuit is conventionally used, whereby the single bidirectional speech channel provided by the telephone line is converted into two separate channels, in each of which speech transmission is effected in only one direction, the respective directions of the two channels being opposite to one another. Such an arrangement simplifies the processing of the telephone speech signals, since each channel can be dealt with separately and amplified or attenuated as desired. However, the provision of a hybrid circuit which provides adequate separation of the two directional speech channels whilst at the same time providing a path which is transparent to d.c. current signals such as are required to be transmitted over the telephone line, has hitherto presented considerable difficulties.

Various forms of hybrid circuit have hitherto been proposed, including the hybrid transformer, and various forms of transformerless or electronic hybrid circuits. All such circuits, however, require that the telephone line be terminated at respective sides of the voice frequency transmission path provided by the hybrid circuit, whilst a bypass path which is opaque to voice frequency signals is provided for transmission of the direct current signals. Moreover, the ports to the voice frequency transmission paths provided by the hybrid circuit must have input and output impedances matching those of the telephone line, whilst the bypass path presents a low impedance to direct current signals but effectively blocks voice frequency signals. In hitherto known circuit arrangements it has not been possible to achieve this object without at the same time introducing across the d.c. current path a capacitance which can interfere with the signalling function of d.c. signals on the telephone line. In particular, the signalling capacitance of the hybrid circuit may be such as to prevent remote testing of the capacitance of the telephone line itself, whereby the appropriate test can only be achieved by temporarily removing the hybrid circuit from the telephone line. This constitutes a serious disadvantage of known hybrid circuit arrangements.

SUMMARY OF THE INVENTION

It is an object of the present invention to provide a signal transmission device of which the transmission characteristics can be controlled in such a manner to overcome disadvantages of the prior art devices referred to above.

It is a further object of the invention to provide such a device for incorporation in a telephone communication system, which is capable of amplifying voice frequency signals whilst providing a signal path which is transparent to d.c. or low frequency switching signals, without the need for terminating telephone lines coupled to the device.

It is a further object of the invention to provide an electronic hybrid circuit for a telephone communication system, which has a lower signalling capacitance than known devices.

In accordance with the invention there is provided a signal transmission device comprising a signal path extending between respective terminals of an input and an output port of the device, a controllable, substantially load independent current source shunting said signal path at a point intermediate said input and output ports, impedance means connected in each series circuit including the terminals of a respective port of the device and the shunt path provided by said current source for presenting at each port an impedance which is high in relation to that of a signal source to be coupled to said input port or of a signal load to be coupled to said output port, as the case may be, said current source being responsive to a voltage signal applied at the terminals of said input port to provide a corresponding magnitude of output current, and means being provided for determining the relative proportions of the current from said current source which pass through the respective impedance means in the input and output circuits of the device, thereby to determine the virtual impedances of the device presented at said input and output ports respectively and to determine the signal gain provided by said device.

A signal transmission device in accordance with the invention has the advantage that it can effectively provide an amplifying, and/or attenuating function, without the need for terminating the transmission circuit at an input or output port having real impedance. The circuit essentially adds voltage in series with the transmission signal path and shunts current across the path, in such a manner that the signal already present in the transmission line is augmented, rather than being dissipated in a terminating circuit.

In principal the device in accordance with the invention may be applicable to any form of signal transmission means, whether uni, or bidirectional. Preferably however, the device is adapted for audio voice frequency transmission, in which case said impedance means may comprise inductor windings connected in series in respective conductors of the signal path, the shunt path provided by said current source being connected between tappings of said inductor windings and the current proportioning means comprising an auxiliary winding inductively coupled to said first windings and connected in series with second substantially load independent current source which is responsive to the voltage signal applied at the terminals of said input port.

In order to perform the function of a hybrid circuit a device in accordance with the invention may be a two-way signal transmission device whereby each port thereof is both an input and an output port and said current sources are correspondingly responsive to voltage signals applied at both ports, and wherein means is provided for preventing the feedback via said current sources of voltage signals occurring at said ports due to signals transmitted through the device.

It will be appreciated that the input and output impedance characteristics of a device in accordance with the invention and the gain, or attenuation of the device, will depend upon the magnitude of the shunt current and the relative proportions thereof flowing through the input and output ports of the device. In order to simplify the design of the characteristics of the device due to the interaction of the abovementioned current sources and inductor windings, therefore, each of said current sources may comprise a plurality of parallel and oppositely sensed control inputs, the terminals of a first one of the ports of the device being respectively connected to oppositely sensed inputs of a first amplifier the output of which is connected to similarly sensed control inputs of the respective current sources, the terminals of the second one of the ports of the device being respectively connected to oppositely sensed inputs of a second amplifier of which the output is connected to oppositely sensed inputs of the respective current sources, and the relative winding senses of the inductors being such that in response to an output signal from a respective one of said amplifiers the currents generated by the current sources tend to induce in the magnetic circuit of said inductor windings, magnetic fluxes which are in aiding relationship as regards the flow of current in the input circuit of that port of the device to which the respective amplifier is coupled and are in cancelling relationship as regards the flow of current in the circuit of the output port. Thus by matching the relative gains of the current sources and the relative inductances of the inductor windings, the first and second amplifiers may be caused solely to simulate required impedances at the respective ports of the device without producing any net transmission of current through the device so that there is zero signal gain. The required signal gain may then be generated by further devices. For example, in one embodiment the device may comprise a third amplifier having an input connected to the output of said first amplifier and an output connected on the one hand to a control input of the shunt current source having the same sense as that connected to the output of the first amplifier, and on the other hand to a control input of the second current source having the opposite sense to that connected to the output of the first amplifier, and a fourth amplifier having an input connected to the output of the second amplifier and an output connected on the one hand to a control input of the shunt current source having the same sense as that connected to the output of the second amplifier and on the other hand to a control input of the second current source having the opposite sense to that connected to the output of the second amplifier.

The said means for preventing the response of the current sources to transmitted voltage signals may comprise a respective potential divider network connected across the output of each of the third and fourth amplifiers and having a tapping respectively connected in each case to an additional input of said second or first amplifier, said potential divider network being effectively connected in parallel with the series connected output and load impedances of the device and comprising in each case a series connected resistance and balance network bearing the same relationship to one another as the respective output and load impedances. Preferably the said tappings of said potential divider networks are each further connected to control inputs of said current sources in order to compensate for transmitted voltage signals appearing at the ports of the device and thus to sustain the simulated impedance of each port of the device at a substantially constant value.

Further features, objects and advantages of the invention will become apparent from the following description in conjunction with the accompanying drawings and the appended Claims.

DETAILED DESCRIPTION OF THE PREFERRED EMBODIMENT

Figure 1:
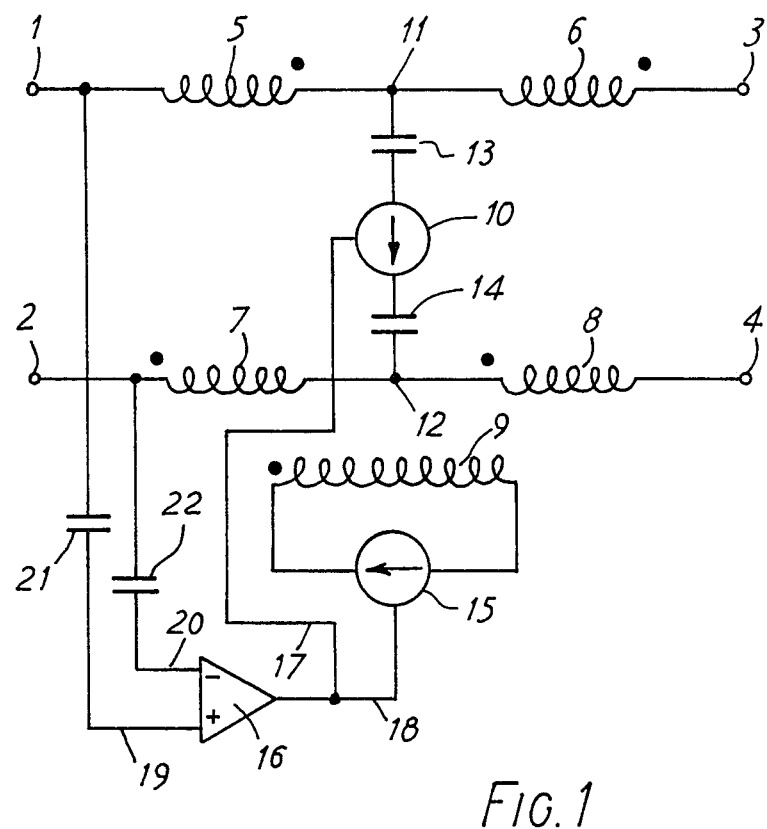
FIG. 1 is a circuit diagram illustrating the principle of the present invention.

Referring to FIG. 1, there is shown, in diagrammatic form, a signal transmission device comprising a pair of input terminals 1,2, and a pair of output terminals 3,4. The transformer comprises a plurality of closely coupled windings 5,6,7,8,9, windings 5 and 6 being connected in series between terminals 1 and 3 to provide a first conductive path, windings 7 and 8 being connected in series between terminals 2 and 4 to provide a second conductive path, and the winding sense of the respective windings being indicated in the conventional manner by means of a dot at one end of each winding. The transformer windings are selected to be of very high inductance, such that, ignoring the influence of further components to be described below, the transmission of voice frequency signals between the input port provided by terminals 1 and 2 and the output port provided by terminals 3 and 4 would be effectively blocked, whereas the transmission path is transparent to d.c. signals.

A controllable current source indicated diagrammatically at 10 is connected to provide a shunt current path from a tapping 11 between transformer windings 5 and 6 to a tapping 12 between transformer windings 7 and 8. The shunt current path is blocked to d.c. current by means of capacitors 13 and 14. A further controllable current source indicated diagrammatically at 15 is connected in series with the transformer winding 9. The controllable current sources 10 and 15 are in each case arranged to provide a current output which is independent of the load on the current source and is controlled in accordance with the output signal from a voltage responsive amplifier 16, as indicated diagrammatically by means of the leads 17 and 18 extending between the amplifier output and the current sources 10 and 15 respectively. The voltage responsive amplifier 16 has inputs 19 and 20 which are respectively coupled to the terminals 1 and 2, by way of coupling capacitors 21 and 22.

The operation of the device illustrated in FIG. 1 is as follows. In use the input port provided by the terminals 1 and 2 will be connected to a signal source having a given output impedance, whereas the output port provided by terminals 3 and 4 will be connected to a load having a given input impedance. In the absence of the current source 10, the circuit provided by the terminals 1 to 4 and transformer windings 5 to 8 would present a relatively low impedance to d.c. signals but a very high impedance to a.c. signals of voice frequency. However, upon the occurrence at terminals 1 and 2 of an a.c. voltage signal from a signal source coupled to the input port, the amplifier 16 causes the current source 10 to drive a corresponding current through the transformer windings, the magnitude of the current being independent of the inductance of the transformer windings or the impedance presented at the input and output ports of the device. In the absence of the transformer winding 9 the current output from the source 10 would be divided between the parallel circuits presented by transformer windings 5,7 and input terminals 1,2 on the one hand, and by transformer windings 6,8 and output terminals 3,4 on the other hand, the relative proportions of the current flowing in the respective circuits being equal, assuming that their impedances balance one another. However, since the current source 15 also is caused to drive a current through the transformer winding 9 in accordance with the output signal from the amplifier 16, the corresponding magnetic flux tending to be generated by the winding 9 will, in view of the close inductive coupling of the respective transformer windings, affect the manner in which the current from the current source 10 is distributed between the input and output circuits of the device. Thus, with the senses of the transformer windings indicated in FIG. 1, the flux generated by the winding 9 will tend to oppose the flow of current from the source 10 through transformer windings 6,8, and aid the flow of current through transformer windings 5,7, so that the current flowing from source 10 will be effectively steered towards the input circuit rather than the output circuit of the device. With an appropriate selection of the turns ratios of transformer windings and the current gain of the sources 10,15, the relative proportions of the current flowing in the input and output circuits of the device can be controlled in any desired manner. Thus, by selecting the magnitude of current that is caused to flow through the transformer windings 5,7 and the impedance presented by the signal source in response to a given voltage signal applied at terminals 1,2, a corresponding simulated input impedance can be caused to appear across the input terminals 1,2, such impedance being lower than the real impedance that would otherwise be presented due to the inductance of transformer windings 5,7. By correspondingly selecting the current that will flow in the output circuit presented by transformer windings 6,8, and the load coupled to terminals 3 and 4, a simulated output impedance can be presented at the terminals 3 and 4, and the gain of the device can be adjusted.

Although the circuit described in FIG. 1 shows for simplicity, a device providing signal transmission in only one direction, the same principle can be applied to a bidirectional signal transmission circuit. Also, although the circuit shown in FIG. 1 could be configured to provide an inherent signal gain, for convenience in design, particularly in the case of a bidirectional transmission circuit, the elements of FIG. 1 are preferably utilised solely to provide a simulated input impedance at terminals 1 and 2, without producing any resulting current in the output circuit whereby the gain of the device is effectively zero. The gain of the device may then be controlled by additional components as will now be described in more detail below with reference to FIG. 2.

Figure 2:
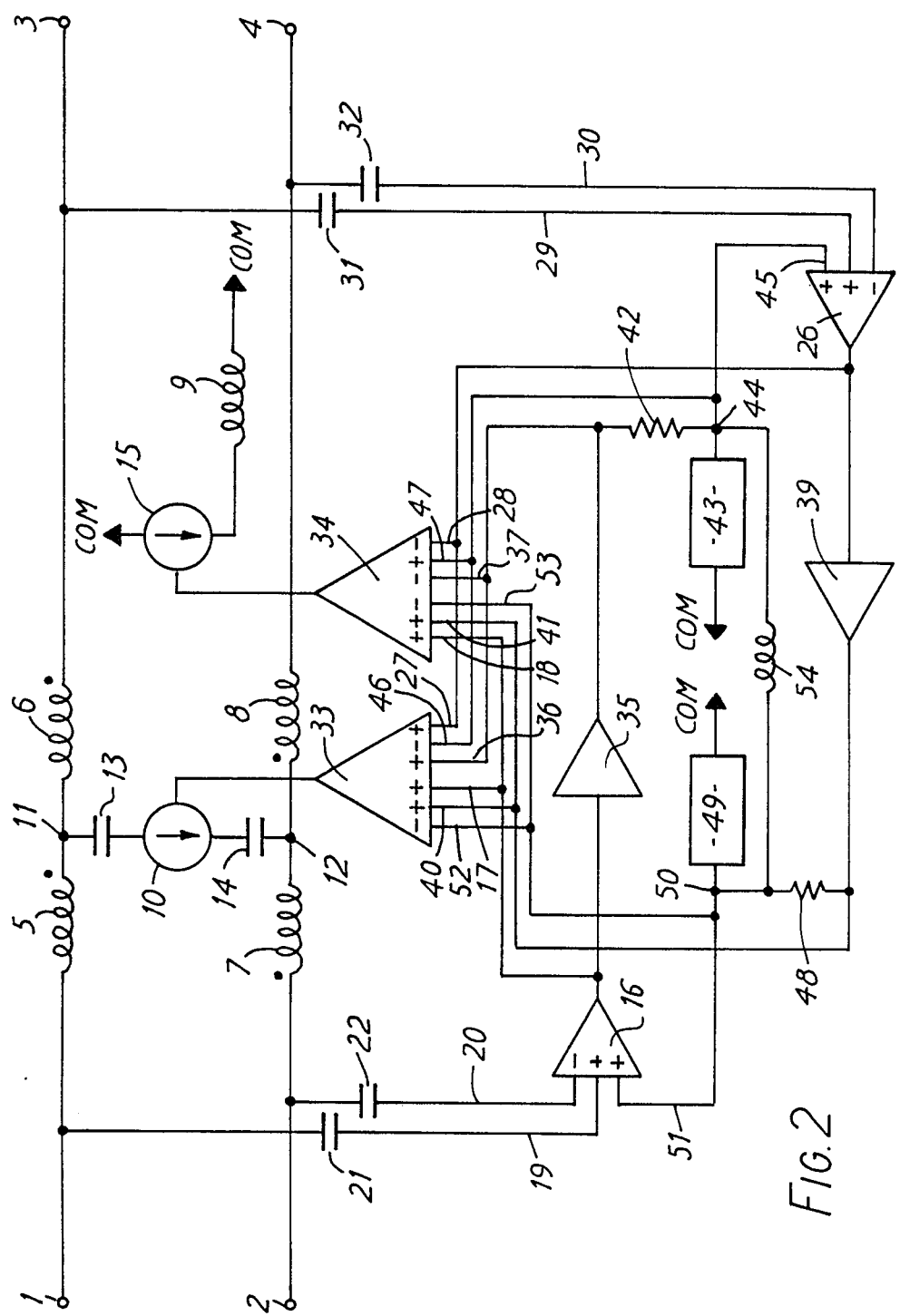
FIG. 2 is a block circuit diagram illustrating the application of the principle to a voice frequency hybrid amplifier for a telephone communication system.

FIG. 2 shows a block circuit diagram of an electronic voice frequency hybrid amplifier for incorporation in a telephone communication circuit. For convenience, those components which correspond with the ones already described with reference to FIG. 1 have been illustrated with the same reference numerals. The circuit of FIG. 2 differs from that in FIG. 1 in that the ports provided by terminals 1,2, and 3,4, each represent both input and output ports of a bidirectional speech transmission circuit. Thus, for example, terminals 1 and 2 may be coupled with the tip and ring leads of a central telephone exchange, whereas terminals 3 and 4 may be connected to the corresponding tip and ring leads of a subscriber telephone line. Since the circuit of FIG. 2 is bidirectional, and must therefore be responsive to voltage signal appearing at terminals 3 and 4 in addition to the signals appearing at terminals 1 and 2, a further amplifier 26, the function of which corresponds with that of amplifier 16, has inputs 29,30 coupled to terminals 3 and 4 via capacitors 31 and 32. The current sources 10 and 15 are responsive to the multiple influences of amplifiers 16 and 26 as well as to further signals provided as described below and to signify this the inputs to the current sources are indicated as being provided by differential amplifiers 33 and 34, although in practice the functions of the current sources and the differential amplifiers can be combined, as will also be explained in more detail below.

As in the case of FIG. 1, the winding senses of the respective transformer windings are indicated in the conventional manner. Also, the respective amplifiers illustrated in FIG. 2 are operational amplifiers supplied in conventional manner from a balanced power supply having positive and negative voltage rails and a common rail at ground or zero potential. The power supplies to the individual amplifier are omitted for clarity, and the circuit connections to the common rail are terminated in the drawing by an arrow and the letters COM.

The output from amplifier 26 is connected to respective inputs of the amplifiers 33 and 34 by way of leads 27 and 28, and it will be noted that whereas the corresponding leads 17 and 18 from amplifier 16 are both coupled to positively poled inputs of the amplifiers 33 and 34, the input lead 27 is connected to a positively poled input of amplifier 33 while lead 28 is connected to a negatively poled input of amplifier 34. Lead 28 is required to be connected to an input of opposite polarity in relation to that of lead 18, in order to ensure that in response to the output signal from amplifier 26 current correspondingly generated from the current source 10 is steered by the current source 15 in the direction of the output circuit to terminals 3 and 4, rather than to the input circuit as in the case of amplifier 16.

As already mentioned above in connection with the description of FIG. 1, the turns ratio of transformer windings 5 to 8 on the one hand, and transformer winding 9 on the other hand, in conjunction with the relative current gains of current sources 10 and 15 are so selected that the effect of the output signals on leads 17,18 and 27,28 is such as to generate, in each case, a simulated impedance across the terminals 1 and 2 or 3 and 4, whilst maintaining an effective signal gain of zero between the respective ports of the device. In order, therefore, to provide for the transmission of signals from the port represented by terminals 1 and 2 to the port represented by terminals 3 and 4, the output of amplifier 16 is connected to the input of a further amplifier 35 the output of which is connected to a positively poled input 36 of amplifier 33, and a negatively poled input 37 of amplifier 34. Depending upon the gain of amplifier 35, therefore, the signals at the inputs 36 and 37 will cause a corresponding variation in the magnitudes of the output currents from the respective sources 10 and 15 in such a sense as to cause a signal current to be steered in the direction of the terminals 3 and 4, to generate a corresponding output signal. Likewise, an amplifier 39 is connected to the output of amplifier 26 and to positively poled inputs 40 and 41 of the amplifiers 33 and 34 so as to provide for the transmission of signals from terminals 3 and 4 to terminals 1 and 2.

It will be noted that, as a result of the transmission of a voice frequency signal through the above described device from one port to the other, there will be superimposed upon the incoming voltage signal applied to each of the amplifiers 16 and 26 a voltage which is due to the signal transmitted through the device from the other port. Therefore, a return loss must be provided to prevent the transmitted signal from being fed back to the input at which it originated and thus causing instability in the bidirectional amplifier. For this purpose there is connected between the output of amplifier 35 and the common supply rail a potential divider network comprising a resistance 42 and a balance network 43, and a tapping 44 between the resistance 42 and the balance network 43 is connected to a third input 45 of amplifier 26.

It will be noted that as a result of the manner in which the simulated impedance is generated at each port of the hybrid amplifier, this impedance effectively appears in series with the load presented to the current source 10 by the outgoing telephone line. Thus, the potential divider network formed by resistance 42 and balance network 43 may be considered as being connected in parallel with the series connected impedances presented by the output port terminals 3, 5 of the device and the telephone subscriber line respectively, and by arranging that the relationship between the resistor 42 and the balance network 43 is the same as that between the output impedance simulated at terminals 3,4, and the impedance of the telephone subscriber line, a bridge network is formed such that the potential at the tapping 44 will correspond to the potential of that component of the voltage signal appearing across the output terminals 3,4, due to the signal transmitted from terminals 1, 2. This signal is applied at input 45 of amplifier 26 in a sense such that the amplifier 26 provides no net output when the bridge network is in a balanced condition, and thus effectively cancels the effect of the transmitted voltage signal. As a result of the cancellation of the transmitted voltage signal, and the fact that the output from amplifier 26 no longer truly represents the voltage appearing at the terminals 3,4, it is necessary to provide a corresponding correction signal to the inputs of amplifiers 33,34, to compensate for the cancellation of the transmitted component of the signal appearing at terminals 3,4, and thus to ensure that the current flow across the terminals 3,4, maintains the simulated impedance thereof at the required value. For this purpose the tapping 44 is also connected to a negatively poled input 46 of amplifier 33 and a positively poled input 47 of amplifier 34.

In a similar manner to that described above, the output of amplifier 39 is connected to a potential divider network comprising resistor 48 and balance network 49, and a tapping 50 is connected on the one hand to a third input 51 of amplifier 16, and on the other hand to two negatively poled inputs 52 and 53 of amplifiers 33 and 34, respectively. The balance networks 43,49 thus represent the impedances of the telephone lines connected to the respective ports of the amplifier, and in order to provide further correction of the balance network, an inductance 54 is connected between the tappings 44 and 50, to simulate the inductance presented between the amplifier ports by the transformer windings 5 to 8.

Figure 3:
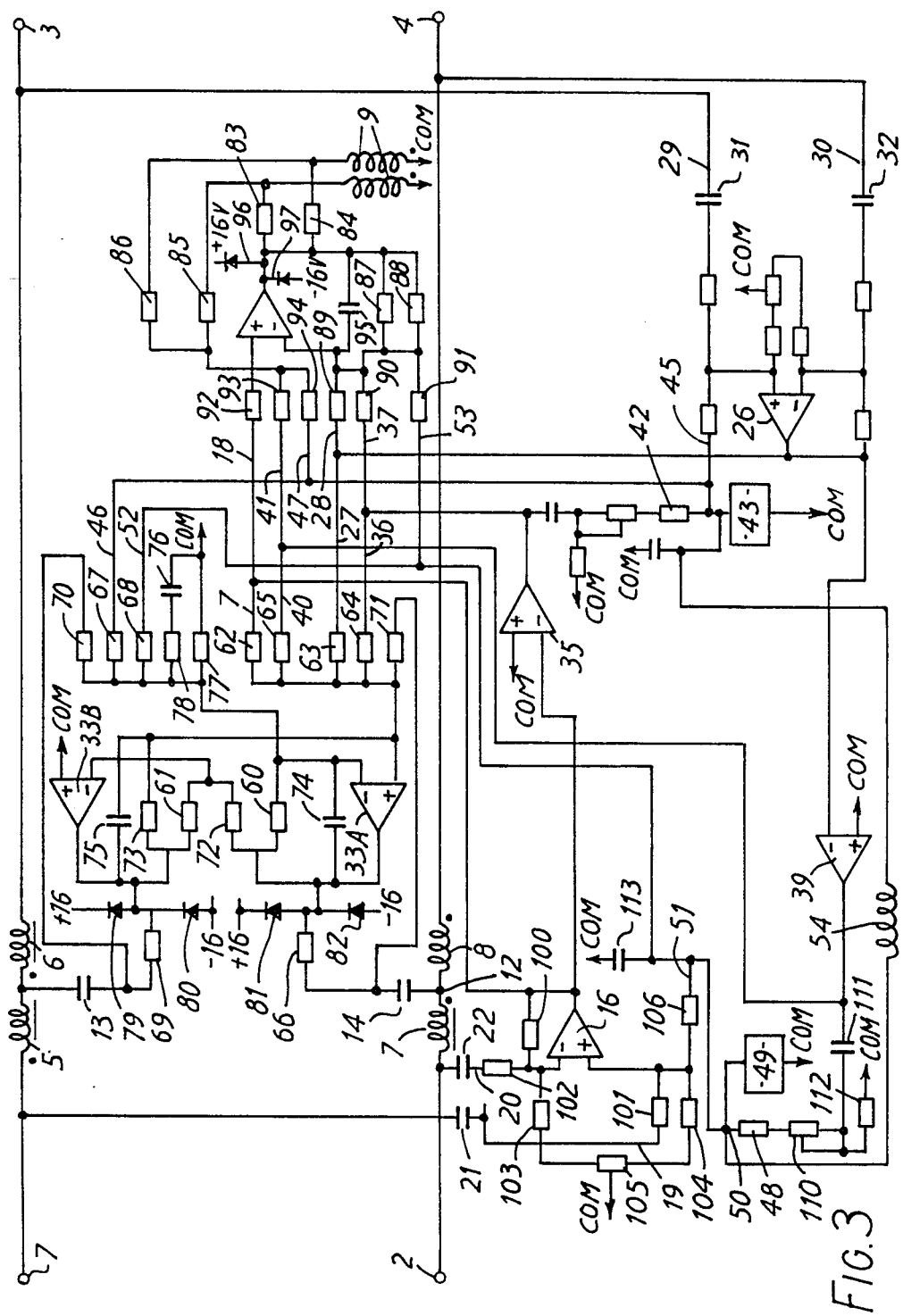
FIG. 3 is a more detailed circuit diagram of the device illustrated in FIG. 2.

Referring now to FIG. 3, the circuit of the hybrid amplifier will be described in more detail, and, as in FIG. 2, all amplifiers illustrated in the drawing are conventional operational amplifiers fed from a balanced power supply, in this case of +16 volts and −16 volts, derived in known manner from the exchange battery potential, the common supply rail being at substantially zero or ground potential. All of the components which correspond to those already described with reference to FIG. 2 are indicated with the same reference numerals. Since the general operation of the circuit has already been described above, only the detailed construction of the individual circuit blocks will be described as follows.

Shunt current Source

The functions of the current source 10 and amplifier 33 of FIG. 2 are provided by a pair of operational amplifiers 33A and 33B operating as a differential current amplifier. The operational amplifier 33A is provided with a negative feedback circuit having a resistor 60 connected between the output and the inverting input of the amplifier, and the amplifier 33B likewise has a feedback circuit including a resistor 61. The respective inputs 17,27,36,40 are connected to the non-inverting input of the amplifier 33A by way of load resistors 62,63,64,65, which serve to decouple the inputs from one another. The output of amplifier 33A is connected through an output resistor 66 and the coupling capacitor 14 to the tapping 12. The inputs 46 and 52 are connected to the inverting input of the amplifier 33A by way of load resistors 67 and 68. The output of amplifier 33B is connected through an output resistor 69 and the coupling capacitor 13 to the tapping 11. The actual output impedance of the combined amplifiers 33A,B is defined by resistors 70 and 71 differentially in series with the coupling capacitors 13 and 14. The output of the amplifier 33A thus develops one of the two components of the differential current signal applied across the tappings 11,12, the other component being established by the amplifier 33B, as a result of the cross connection of the output of amplifier 33A to the inverting input of amplifier 33B by way of resistor 72, and the similar connection of the output of amplifier 33B to the non-inverting input of amplifier 33A by way of resistor 73. The outputs of the amplifiers 33A and 33B are thus equal in magnitude but opposite in phase. Capacitors 74 and 75 connected between the respective outputs of amplifiers 33A and 33B and the inverting and non-inverting inputs of amplifier 33A respectively serve to provide for high frequency stability, two capacitors being used for longitudinal balance. A capacitor 76 in conjunction with resistors 77 and 78 is connected between the inverting input of amplifier 33A and the common rail to provide low frequency stability by increasing the output resistance at very low frequencies.

In order to ensure that the current output of the current source is constant for a given input voltage, the feedback resistors 60 and 71 are connected to opposite ends of the resistor 66 in order to sense the voltage across the resistor 66, whereas feedback resistors 61 and 70 are likewise connected to opposite ends of the resistor 69 in order to sense the voltage across the latter. Since the sensed voltage across resistor 66 is proportional to the amplifier output current conducted thereby, the differential feedback signal is thus also proportional to the amplifier output current conducted by resistor 66, and likewise the differential feedback signal detected by resistors 61 and 70 is proportional to the amplifier output current conducted through resistor 69. The differential feedback signals are summed in the respective amplifiers 33A and 33B and thus operate to maintain the differential output current at a value that is substantially independent of the load impedance. Diodes 79,80,81,82 may be connected between the respective outputs of the differential current amplifier and the positive and negative supply rails, in order to protect against high voltage transients such as may occur during lightning strikes or d.c. voltage signalling.

Direction Controlling Current Source

For purposes that will be explained in more detail below, the amplifier 34 is provided with twin outputs to two duplicated transformer windings 9 via respective output resistors 83 and 84. Feedback resistors 85 and 86 are respectively connected between the output ends of resistors 83 and 84 and the non-inverting input of amplifier 34, whereas feedback resistors 87 and 88 are connected between the output of amplifier 34 and the inverting input thereof. Load resistors 89,90,91 are respectively connected between the inputs 28,37 and 53 and the inverting input of the amplifier 34, and serve to decouple the respective inputs 28,37 and 53, while load resistors 92,93,94 are likewise connected between the inputs 18,41 and 47 and the non-inverting input of amplifier 34. The amplifier 34 thus serves to provide a current output which is the algebraic sum of the respective voltage input signals applied at the six inputs 18,28,37,41,47 and 53, and this output current is maintained constant regardless of the load presented by the transformer windings 9, by means of the feedback resistors 85,86,87,88, which serve to sense the voltage drop across the respective resistors 83,84. The use of two parallel connected feedback resistors 87 and 88, which have equivalent values to the resistors 85 and 86, serves to ensure matching of the feedback circuits to the respective sides of the amplifier, whilst the use of the separate output resistors 83 and 84 feeding the respective windings 9 serves to cancel any d.c. offset which may arise in the transformer windings. A capacitor 95 serves to prevent high frequency oscillations that would otherwise occur because of out of band resonance due to the stray capacitance and leakage inductance of the transformer. The output of amplifier 34 is connected to the positive and negative supply rails by diodes 96,97, to provide transient protection.

Signal Voltage Sensing Circuit

Since the hybrid amplifier is a symmetrical device, and the amplifiers 16,26 together with the associated components are identical, only the circuitry associated with amplifier 16 will be described in detail, it being understood that the respective circuit components are repeated identically in association with the amplifier 26.

The amplifier 16 comprises a feedback resistor 100 coupled between the output of the amplifier and its inverting input, and input resistance 101,102 connected between the respective input leads 19 and 20 and the non-inverting and inverting inputs of the amplifier respectively. The feedback resistor 100 in conjunction with the input resistors 101 and 102 determine the effective gain of the amplifier 16, which, together with the gain of the shunt current source described above, is so selected that the required input impedance is generated across the terminals 1,2. Typically, in order to provide a simulated impedance of 600 ohms, the feedback resistor 100 might have a value of 154KΩ and the input resistors 101,102 have values of 100KΩ to provide the amplifier 16 with a gain of 1.54, whilst the shunt current source has a gain of approximately 50. Resistors 103,104 are connected between the inverting and non-inverting inputs of amplifier 16 and the current supply rail, by way of a trimming potentiometer 105, to form potential divider networks in conjunction with the input resistors 101,102. This is to allow for greater than 50 volt rms voltages at 50 or 60 Hz longitudinal input that can occur on some telephone lines. Since these lines also have longitudinal harmonics in the voice band, the trimming potentiometer 105 provides adjustment for a high degree of longitudinal rejection. A further input resistor 106 is connected from the input lead 51 to the non-inverting input of amplifier 16 in order to provide a single ended input from the tapping 50 of the potential divider network 48,49.

Voice Frequency Gain Amplifier

As in the case of the amplifiers 16,26, the amplifiers 35,39 are also identical and symmetrical. Amplifier 35 serves to provide amplification of the output signal from amplifier 16 prior to application thereof to the input 37 of amplifier 34, whereby, as discussed above, the current output from amplifier 34 causes a resultant current to flow through the port provided by terminals 3 and 4, thus providing the required amplified voice frequency output signal. Although amplifier 35 has been indicated diagrammatically as a simple operational amplifier, in practice the amplification channel provided by the amplifier 35 is identical in function to the voice frequency transmission channel of a known electronic hybrid amplifier, and, as in the case of such amplifiers, may be utilised to introduce any desired frequency compensation or gain characteristics of the amplification channel. For example, the amplifier 35 may include high and low pass filters for added stability, as well as a low frequency dependent clamp to prevent overdriving of the shunt current source at low frequency and the consequent instability that would result from saturation of the shunt current source. Such techniques, are, however, known in relation to electronic hybrid circuits, and for a discussion thereof reference may be made to U.S. Pat. No. 4,331,842 the disclosure of which is incorporated herein by reference.

Potential Divider and Balance Network.

As described above the potential divider network formed by resistance 48 and balance network 49 serves to provide an input to amplifier 16 from tapping 50, and, since the corresponding network feeding amplifier 26 is symmetrical and identical, it will not be described in further detail. The simulated output impedance of each of the ports of the device is approximately 600 ohms + 4 µF. Resistance 48 has a nominal value of 560 ohms, and a further variable resistor 110 of 100 ohms is provided in series therewith to enable setting up of the desired 600 ohm impedance with some adjustment range to accommodate other additional errors in the amplifiers. A capacitors 111 having a value of 4.7 µF is connected in series with resistors 48 and 110 and a further resistor 112 having a value which is relatively high in relation to that of the potential divider network is connected in parallel with resistors 110,48 and the balance network 49, in order to obtain a phase shift required to make capacitor 111 appear as if it were approximately 4 µF. In addition resistor 112 provides a d.c. bias impedance that would otherwise be missing. The balance network 49 is provided to simulate the load impedance presented by the telephone line, and may be constructed in conventional manner, as will be apparent to those skilled in the art. Conveniently, the balance network 49, and also the balance network 43, may be provided by exchangeable units to enable the device readily to be matched to given working requirements. Since, for reasons to be discussed below, the windings of the transformer are wound bifilar and cause a small capacitance to appear across the line port of the device, a corresponding matching capacitance 113 is connected in parallel with the balance network 49. Also, in order to compensate for the inductance of the transformer appearing in series between the ports of the device, the inductor 54 is connected between tappings 50 and 44, as already described above. Typically, such an inductance may have a value of approximately 3.6H.

Figure 4:
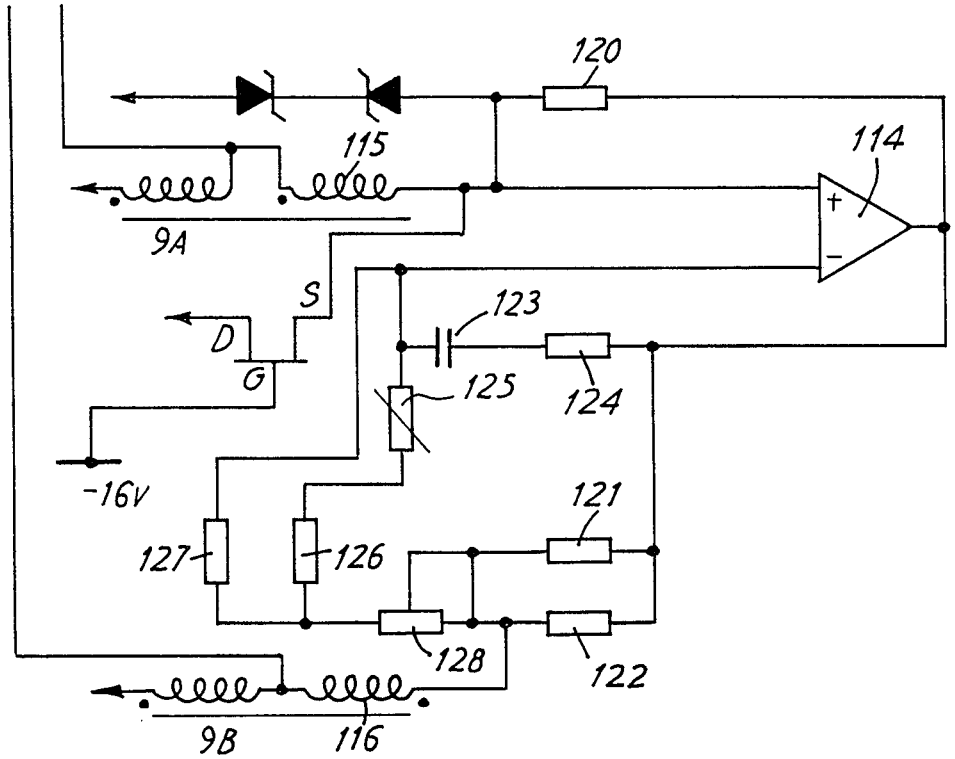
FIG. 4 is a circuit diagram of an inductance boosting circuit for use with the device of FIG. 3.

In the above description it has been assumed for simplicity that the windings 5 to 9 of the transformer are of the required high inductance to provide the desired function of the hybrid amplifier, whilst at the same time transmitting the d.c. signalling currents that arise on the telephone line. However, the ideal magnetizing inductance of such a transformer would be very large, since in practice it has to be capable of conducting d.c. line currents of up to 60 milliamps without significant reduction of the inductance presented to a.c. voice frequency signals. In the device described above, therefore, there is used an inductance boosting circuit in order to reduce the required size of the transformer. Such inductance boosting circuits are described in U.S. Pat. No. 3,881,149, the disclosure of which is incorporated herein by reference, and in such circuits the apparent inductance of a transformer is increased above that of its real value by providing the transformer with an auxiliary, or tertiary, winding which is so connected in an active circuit which regulates current flowing in the tertiary winding that a negative inductance is caused to appear in parallel with the magnetising inductance of the transformer core, and a negative resistance substantially equal to that of the resistance of the tertiary transformer winding is caused to appear in series therewith. The circuit of the inductance boosting device incorporated in the above described hybrid amplifier is illustrated in FIG. 4, and the principle of operation thereof corresponds generally with that of the device shown in FIG. 4 of U.S. Pat. No. 3,881,149, with the exception that the transformer windings 5,6,7,8 of the device in accordance with the present invention form mutually coupled inductances includes in a single transmission circuit, rather than being primary and secondary windings of a conventional transformer arrangement. Moreover, the use of four auxiliary transformer windings 9A, 9B,115,116, which are wound in the senses indicated in FIG. 4 enable the four auxiliary windings on the one hand to serve the function of the winding 9 referred to above, and on the other hand to serve the function of the tertiary winding 14d and the dummy winding 32 illustrated in FIG. 4 of U.S. Pat. No. 3,881,149. Thus, transformer windings 9A and 115 comprise the impedance boosting tertiary winding of the transformer whereas windings 9B,116 comprise the dummy winding in the circuit of an operational amplifier 114, the function of which corresponds to that of amplifier 18 of U.S. Pat. No. 3,881,149. The tertiary winding 9A,115 is connected in series with a resistor 120 to the output of operational amplifier 114 in order to form one leg of the impedance boosting circuit, the other leg being provided by the parallel connected resistors 121,122, and windings 9B,116 of the transformer. It will be noted that whereas the windings 9A,115 are wound in the same sense to form the inductance boosting tertiary winding, the windings 9B,116 are wound in opposite senses so that they present zero net inductance to the output of the amplifier 114. For optimum balance of the circuit windings 9A and 9B are wound bifilar, as are windings 115, 116, each with an equal number of turns. Moreover, winding 9A and winding 116 on the one hand and winding 9B and 115 on the other hand are both wound from the same spool of wire, so that any mismatch in the resistance of the two spools of wire is cancelled out. Ideally, the negative resistance presented due to the resistance of the windings 9B,116 should be only very slightly less than the positive resistance presented by windings 9A,115, and therefore the relationship between the resistor 120 and the parallel connected resistors 121,122 is made such that the desired negative resistance value is obtained.

The amplifier 114 further has, connected between its output and its inverting input a first feedback loop including a resistor 124 and a capacitor 123 and a second feedback loop including the parallel connected resistors 121,122 and a network of resistors 125,126,127 and 128. It can be shown that the negative inductance generated by the circuit of FIG. 4 corresponds to the following formula:

$$-L = C \times R1 \times R2(1 + R3)\left(\frac{1}{R4} + \frac{1}{R1}\right),$$

where
- $-L$ = the negative inductance,
- $C$ = the capacitance of capacitor 123,
- $R1$ = the resistance of resistor 120,
- $R2$ = the combined resistance of resistor network 125,126,127,128,
- $R3$ = the combined resistance of transformer windings 9B,116, and
- $R4$ = the combined resistance of resistors 121 and 122.

The resistor 5 comprises a negative temperature coefficient thermistor, with resistor 128 being a trimming potentiometer, and resistors 126 and 127 serving to linearize the response of thermistor 125 to substantially cancel the temperature coefficient of the transformer windings 9B,116. Resistor 124 is provided to generate a negative resistance across the transformer, to cancel the loading effect presented by components of the hybrid amplifier circuit. A field effect transistor 130 is connected in parallel with the tertiary winding 9A,115, to monitor the d.c. gain of amplifier 114 and adjust the ratio of the resistance presented by resistor 20 to that of the active circuit.

Thus, it will be seen that the present invention provides a unique hybrid amplifier circuit, wherein signal gain is effectively added to the existing telephone line signal without the requirement for terminating the telephone line at the respective ports of the device, thus enabling the d.c. signalling capacitance to be substantially reduced in comparison with previously known devices. For example, the circuit arrangement enables the capacitors 13 and 14 each to have a value of 0.1 µF and the capacitors 21,22,31,32, each to have a value of 0.047 µF, so that the total d.c. signalling capacitance of the device is less than 0.15 µF.

We claim:
1. A signal transmission device comprising a signal path extending between respective terminals of an input and an output port of the device, a controllable, substantially load independent current source shunting said signal path at a point intermediate said input and output ports, impedance means connected in each series circuit including the terminals of a respective port of the device and the shunt path provided by said current source for presenting at each port an impedance which is high in relation to that of a signal source to be coupled to said input port or of a signal load to be coupled to said output port, as the case may be, said current source being responsive to a voltage signal applied at the terminals of said input port to provide a corresponding magnitude of output current, and means being provided for determining the relative proportions of the current from said current source which pass through the respective impedance means in the input and output circuits of the device, thereby to determine the virtual impedances of the device presented at said input and output ports respectively and to determine the signal gain provided by said device.

2. A device as claimed in claim 1, adapted for audio frequency signal transmission, wherein said impedance means comprises inductor windings connected in series in respective conductors of the signal path, the shunt path provided by said current source being connected between tappings of said inductor winding and the current proportioning means comprising an auxiliary winding inductively coupled to said first windings and connected in series with second substantially load independent current source which is responsive to the voltage signal applied at the terminals of said input port.

3. A device as claimed in claim 2, wherein said device is a two way signal transmission device whereby each port thereof is both an input and an output port and said current sources are correspondingly responsive to voltage signals applied at both port, and wherein means is provided for preventing feedback via said current sources of voltage signals occurring at said ports due to signals transmitted through the device.

4. A device as claimed in claim 3, wherein each of said current sources comprises a plurality of parallel and oppositely sensed control inputs, the terminals of a first one of the ports of the device are respectively connected to oppositely sensed inputs of a first amplifier the output of which is connected to similarly sensed control inputs of the respective current sources, the terminals of the second one of the ports of the device are respectively connected to oppositely sensed inputs of a second amplifier of which the output is connected to oppositely sensed inputs of the respective current sources, and the relative winding senses of the inductors are such that in response to an output signal from a respective one of said amplifiers the currents generated by the current sources tend to induce in the magnetic circuit of said inductor windings, magnetic fluxes which are in aiding relationship as regards the flow of current in the input circuit of that port of the device to which the respective amplifier is coupled and are in cancelling relationship as regards the flow of current in the circuit of the output port.

5. A device as claimed in claim 4, wherein said device comprises a third amplifier having an input connected to the output of said first amplifier and an output connected on the one hand to a control input of the shunt current source having the same sense as that connected to the output of the second amplifier and on the other hand to a control input of the second current source having the opposite sense to that connected to the output of the second amplifier.

6. A device as claimed in claim 5, wherein the said means for preventing response of the current sources to transmitted voltage signals comprise a respective potential divider network connected across the output of each of the third and fourth amplifiers and having a tapping respectively connected in each case to an additional input of said second or first amplifier, said potential divider network being effectively connected in parallel with the series connected output and load impedances of the device and comprising in each case a series connected resistance and balance network bearing the same relationship to one another as the respective output and load impedances.

7. A device as claimed in claim 6, wherein the said tappings of said potential divider networks are each further connected to control inputs of said current sources in order to compensate for transmitted voltage signals appearing at the ports of the device and thus to sustain the simulated impedance of each port of the device at a substantially constant value.

* * * * *